US 7,737,840 B2

(12) United States Patent  
Kopp

(10) Patent No.: US 7,737,840 B2  
(45) Date of Patent: Jun. 15, 2010

(54) CONTAINER SECURITY SYSTEM

(75) Inventor: Eugene H. Kopp, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 507 days.

(21) Appl. No.: 11/401,622

(22) Filed: Apr. 10, 2006

(65) Prior Publication Data

US 2007/0241889 A1 Oct. 18, 2007

(51) Int. Cl.
*G08B 1/08* (2006.01)
(52) U.S. Cl. .............................. 340/539.13; 340/545.1; 340/568.1; 340/539.17
(58) Field of Classification Search ............ 340/539.13, 340/539.1, 539.11, 568.1, 572.1, 541, 545.1, 340/545.6, 686.1, 539.26, 539.17
See application file for complete search history.

(56) References Cited

U.S. PATENT DOCUMENTS

| | | | |
|---|---|---|---|
| 5,712,789 A | 1/1998 | Radican | |
| 5,774,876 A | 6/1998 | Woolley et al. | |
| 5,825,283 A | 10/1998 | Camhi | |
| 5,917,433 A * | 6/1999 | Keillor et al. | 340/989 |
| 6,148,291 A | 11/2000 | Radican | |
| 6,628,941 B2 | 9/2003 | Knoblach et al. | |
| 6,657,549 B1 | 12/2003 | Avery | |
| 6,753,775 B2 * | 6/2004 | Auerbach et al. | 340/539.22 |
| 6,972,682 B2 * | 12/2005 | Lareau et al. | 340/568.1 |
| 7,245,223 B2 * | 7/2007 | Trela | 340/573.1 |
| 7,323,981 B2 * | 1/2008 | Peel et al. | 340/539.13 |
| 7,405,655 B2 | 7/2008 | Ng et al. | |
| 7,522,043 B2 | 4/2009 | English et al. | |
| 2002/0120394 A1 | 8/2002 | Rayne | |
| 2003/0105971 A1 | 6/2003 | Angelo et al. | |
| 2003/0137968 A1 | 7/2003 | Lareau et al. | |
| 2003/0160695 A1 | 8/2003 | Hisano | |
| 2004/0196152 A1 | 10/2004 | Tice | |
| 2005/0197844 A1 | 9/2005 | Ng et al. | |
| 2006/0164231 A1* | 7/2006 | Salisbury et al. | 340/505 |
| 2006/0181413 A1* | 8/2006 | Mostov | 340/539.22 |
| 2006/0261944 A1 | 11/2006 | Ng et al. | |
| 2007/0093200 A1* | 4/2007 | Dobosz | 455/3.02 |

FOREIGN PATENT DOCUMENTS

WO PCT/US2007/006524 3/2007

* cited by examiner

*Primary Examiner*—Daniel Previl  
(74) *Attorney, Agent, or Firm*—Tung & Associates

(57) ABSTRACT

A security system for shipping containers transported onboard a vessel detects intrusions into the containers and transmits a security message to a land-based security monitoring station that identifies the container and the current geographic location of the vessel. Each container protected by the security system is provided with a cellular telephone that initiates a limited range telephone call transmission in response to an intrusion. Multiple base stations spread over the vessel each receive calls from proximal containers and forwards call messages to the vessel's communication system which retransmits the call information in the form of the security message to the land based monitoring station.

36 Claims, 1 Drawing Sheet

CONTAINER SECURITY SYSTEM

FIELD OF THE INVENTION

This invention generally relates to security for shipping containers, and deals more particularly with a system for detecting and reporting intrusion into containers conveyed in groups, especially on vessels, on a near real-time basis.

BACKGROUND OF THE INVENTION

A substantial amount of the goods that are transported between countries throughout the world are shipped in standardized steel containers twenty or forty feet in length. These containers are carried on ocean going vessels to destination ports where they are unloaded and delivered to their destinations either by truck or rail. Ocean-going vessels specially configured to ship such containers are sometimes referred to as container ships that can carry as many as 5,000 tightly stacked containers. In some cases, the containers are provided with integral twist locks that lock the eight corners of the container to a neighboring container. In other cases, the containers are simply held together by gravity, aided by "hardened" container corners that facilitate aligned stacking.

Because of the widespread use of containerized shipping, security concerns have increased recently where containers must be left unguarded on ocean-going vessels during extended voyages. For example, one security concern may be that of terrorists attempting to place a weapon of mass destruction in a container after it has been loaded onto a vessel. Similarly, contraband items such as drugs may be introduced into containers by drug smugglers after container loading onto a vessel, allowing the drugs to illegally enter a destination port completely undetected. Still another security concern is theft and pilfering of container contents.

A number of solutions have been proposed to deal with the problem of container security. One known solution involves detecting intrusions into a container and simply recording information related to the intrusion for later playback and review. This solution, does not, of course, alert security personnel in sufficient time to allow them to apprehend the intruder or prevent an act of theft or destruction. Another solution uses a GPS receiver to record the location of a container when an intrusion is detected, and a satellite communication system to transmit intrusion and location information to a land-based operations center. However, since the containers are normally stacked on vessels up to fifteen or more containers high, only the security system on the top container has a "view of the sky" adequate to receive GPS signals and transmit security messages to a satellite system. Accordingly, containers below the top container cannot report security status information during a voyage.

It has also been proposed to equip containers with cellular telephones that initiate calls via conventional cellular networks to an operations center in order to report a container intrusion. This approach is not suitable however, for use with containers on-board a vessel during ocean transits where the containers are typically out of range of land-based, commercial cellular telephone networks. Thus, using prior art solutions to the problem, the possibility exists that someone on-board the vessel could open doors on one or more on board containers during the voyage and the intrusion would not be reported to security authorities until the vessel reached its destination. By this time, however, pilfering of container contamination would have already occurred or weapons of mass destruction would have reached a location where they could inflict considerable damage.

Accordingly, what is needed is a shipping container security system that allows constant monitoring for possible intrusions and near real time reporting of intrusions during ocean transit. The present invention is intended to satisfy this need in the art.

SUMMARY OF THE INVENTION

According to one aspect of the invention, a security system is provided for shipping containers carried on a vessel. The system comprises a detection device carried on each container for detecting an intrusion into the container; a radio carried on each of the containers, each of the radios being coupled with a corresponding detection device and responsive to a detected intrusion for transmitting a signal indicating an intrusion; at least one base radio station on the vessel for receiving signals from the container radio; and, a communication system on-board the vessel for transmitting intrusion event information to a location off-board the vessel. The radios preferably comprise a conventional cellular telephone having an identification number related to the container in which it is installed. A plurality of the base stations are preferably spread over the vessel so as to assure that each container is within reception range of at least one base station. The system further comprises a computerized controller for coordinating calls received by the base stations and for transmitting security messages, via a satellite, that may include the GPS coordinates of the vessel and/or the vessel's identification data.

According to another aspect of the invention, a security system is provided for a group of shipping containers carried on a shipping conveyance such as a vessel. The system comprises a plurality of intrusion detection devices respectively associated with the containers for detecting an intrusion into the associated container; a plurality of cellular telephone units respectively coupled with the intrusion devices and operable for initiating a telephone call when the associated intrusion device detects an intrusion; and, an on-board communication system for receiving telephone calls initiated by the cellular telephones, and for sending messages to a security monitoring station to advise of the intrusion. The cellular telephone units are normally operable for duplex communication on frequencies between about 800 MHz and 1900 Hz. The system further comprises a plurality of base communication stations at spaced apart locations on the conveyance such that each cellular telephone unit is within communication range of at least one of the base stations.

According to still another aspect of the invention, a method is provided for monitoring the security status of shipping containers being transported on a shipping conveyance such as a vessel. The method comprises the steps of detecting a breach of security in one of the containers; initiating, in response to the breach, a wireless cellular communication transmission from the container to a base station on-board the conveyance; receiving the cellular transmission at the base station; generating a security status message on-board the conveyance using the information in the cellular transmission; and, transmitting the message to a security monitoring station off-board the conveyance. The security message preferably includes an identification of the container in which the security breach was detected as well as the geographic location of the conveyance.

In accordance with yet another aspect of the invention, a method is provided for monitoring security intrusions into shipping containers on a vessel. The method comprises the steps of detecting an intrusion into one of the containers; initiating a limited range, wireless radio transmission from the container which includes information related to the intrusion; receiving the transmission at a base communication station on-board the vessel; and, re-transmitting the information from the vessel to a security monitoring station off-board the vessel.

It is a significant feature of the invention that all containers on-board a vessel can be continuously monitored for security intrusions throughout the entire voyage of the vessel, irrespective of their positions in the stacks of containers. An advantage of the invention is that security authorities are notified in near real-time of a container intrusion so that adequate time is provided for interdicting the vessel or apprehending the persons responsible for the intrusion. A further advantage of the invention is that it may be easily implemented using low cost, existing cellular telephone equipment, and the existing communication infrastructure of vessels.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
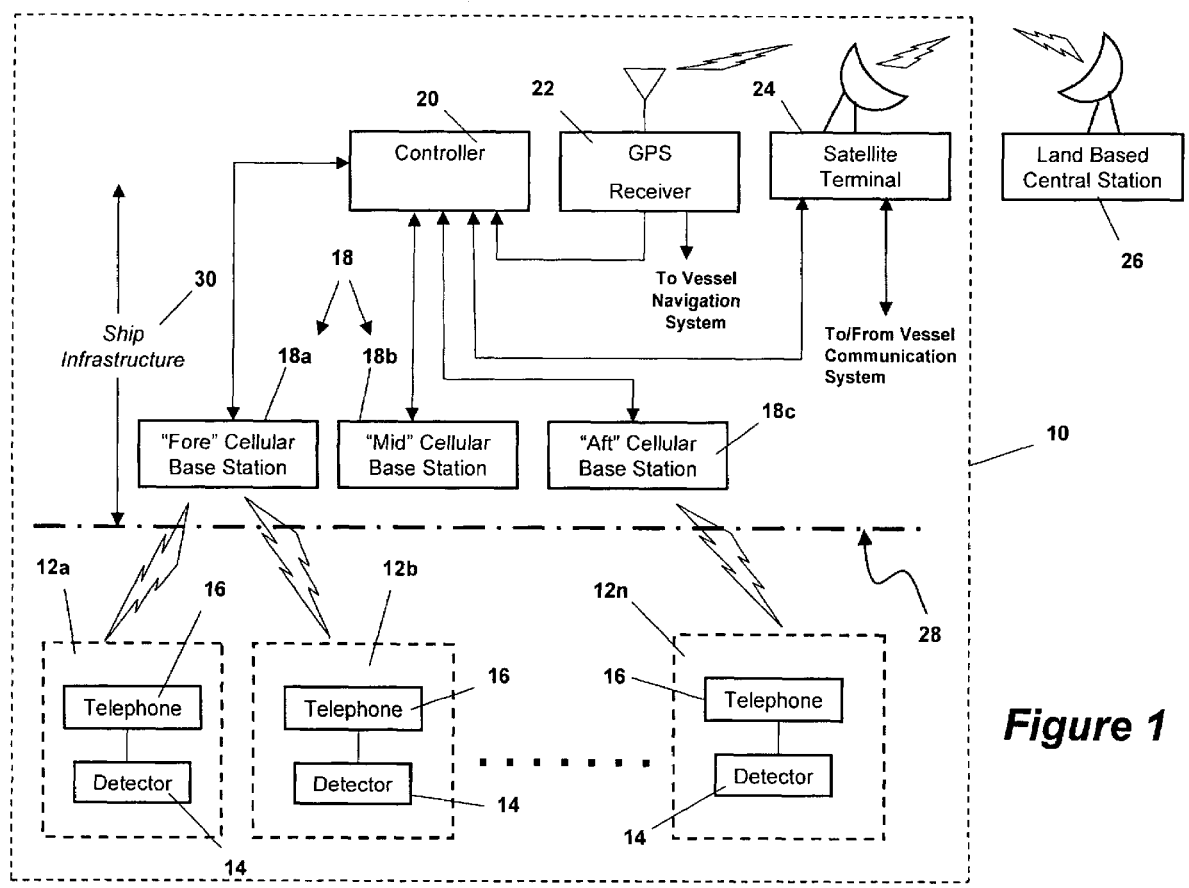
FIG. 1 is a block diagram of a container security system according to one preferred embodiment of the invention.

Referring to FIG. 1, the present invention relates to a container security system 10 for reporting, in near real-time, security breaches, such as intrusions into shipping containers (not shown) on-board a vessel, such as a container ship where the containers are stored in stacked relationship. At least certain of the containers is provided with a container security device (CSD) 12 which preferably is mounted inside the container so as to be protected against damage or tampering. The containers are typically rigid, sealed enclosures, such as the well known steel shipping containers 20 or 40 feet in length having standardized dimensions and features that facilitate stacking them in interlocking relationship.

Each of the CSDs 12a-12n shown in the illustrated embodiment includes a detector 14 connected with a wireless communications transmitter in the form of a cellular telephone 16. The detector 14 detects security events of interest, such as an intrusion into the container in which it is installed. Thus, for example, the detector 14 may comprise a simple switch activated by the opening of a door on the container, or it may be a motion sensor, light sensor, heat sensor or explosives sensor. Multiple detectors may be used in the same container to detect different types of events, e.g. intrusion and fire. Such detectors are commercially available and therefore need not be described in detail therein. It should be emphasized here that, as mentioned above, not all of the containers on the vessel need be equipped with a CSD 12. Containers with and without CSDs 12 can be mixed on the same vessel.

The telephone 16 may comprise a conventional cellular telephone, also known as a mobile phone, readily available from a variety of commercial sources. Each of the telephones 16 possesses a unique identification number, i.e. phone number that is associated with the container in which the telephone is installed. Suitable interface circuitry, conventional in the art, interconnects each CSD 12a-12n with associated cellular telephone such that the telephone 16 is responsive to activation of the associated detector 12 to initiate a telephone call containing a message relating to the detected security event at the container. Each of the telephones 16 has an antenna (not shown) normally mounted outside of the container (typically on the exterior surface of the container), for transmitting and receiving calls.

The container security system 10 further includes one or more cellular telephone base stations 18 on-board the vessel that receive calls from the telephones 16. In the illustrated embodiment, three base stations 18a, 18b and 18c are illustrated which are respectively mounted at fore, mid and aft locations on the vessel. The number of base stations used and their placement in a particular application will depend on the number of containers, the length and physical configuration of the vessel, and the propagation characteristics of cellular signals in the particular container environment. As is common in cellular networks, each of the CSDs 12 communicates with the base station 18 that receives the strongest signal.

The cellular telephones 16 and base stations 18 may utilize any of various well known technologies such as FDMA, TDMA or CDMA. Cellular telephone systems currently in use, including second and third generation technologies, operate between approximately 800 MHz and 1900 MHz. One system widely used throughout the world is GSM (global system for mobile communications) which utilizes TDMA and encryption technologies. Any of these currently available systems and technologies may be employed in connection with the present invention, however until a particular system is chosen as the world wide standard, it may be necessary to employ base stations 18 using more than one of the currently existing technologies to accommodate cellular telephones 16 that use different systems. It should be noted here that as an incidental benefit of the present invention, cellular telephone service is provided throughout the vessel for normal voice calls. Thus, shipboard personnel may make cellular calls to other personnel on-board the vessel, or to land based parties using the satellite communication infrastructure on the vessel to forward the voice calls.

The base stations 18 are controlled by a computer based controller 20. The controller 20 aggregates the message reports from the base stations 18 and appends the current location (e.g., coordinates) of the vessel based on vessel location received from a GPS receiver 22 on-board the vessel. The controller 20 forwards the messages and/or aggregated reports with the vessel position information to an on-board satellite communication terminal 24 which transmits the information via communication satellites to a land based monitoring station 26 where the security status information can be reviewed by security personnel for appropriate action.

As shown in the FIGURE, the components above the broken line 28 within container security system 10 form part of the vessel's infrastructure 30, while the components below line 28 are associated with containers being shipped on the vessel. In the illustrated embodiment, the GPS receiver 22 also functions to provide the vessel's navigation system with GPS location information. The satellite terminal 24 forms part of the vessel's existing communication system.

In operation, the detectors 14 function to sense security events related to the associated container, such as the opening of an access door, causing the associated cellular telephone 16 to initiate a call. The call is received by the base station 18 that receives the strongest call signal from the calling telephone 16. Usually, the base station 18 receiving the call is the one that is physically nearest the container from which the call originates. Note here that all calls are received by at least one of the base stations 18, regardless of the calling container's position in a container "stack." The message transmitted by the cellular telephone 16 to a base station 18 may include any of various information, but will normally include at least the container identification number and the time of the message transmission. Alternatively, the base stations 18 may append the time of the transmission when it forwards the message to the controller 20. Importantly, since the cellular connection between the base stations 18 and the telephones 16 is duplex i.e. two-way, the controller 20 and/or base stations 18 can "talk to" any of the CSDs 12a-12n. Thus for example, in the event that one of the CSDs 12a-12n reports a security event such as "door open" and the controller 20 wishes to verity the reported event before sending notice to the monitoring central station 26, the controller 20 and/or the base station 18 receiving the alarm message can instruct the telephone 16 to verify the detected condition and then retransmit a message, thus eliminating possible false alarms due to momentary communication "glitches.

As previously noted, the controller 20 normally aggregates information from the base stations 18 and periodically delivers a report to the land-based monitoring stations 26. In order to conserve bandwidth, the report generated by the controller 20 may include only those containers that report a security related event, that is, reporting by exception. Using the container security system of the present invention as described above, land-based monitoring stations 26 will receive periodic reports regarding the security of each of the containers onboard the vessel up until the vessel arrives at a destination port. The reports can be sent periodically in batches as indicated above, or immediately upon the detection of a security event, thus providing near real-time critical security information to land based monitoring stations 26. In the event that the reported security information reveals an alarm or other security condition raising suspicion or concern, the vessel can be diverted well before it reaches its destination port.

Although this invention has been described with respect to certain exemplary embodiments, it is to be understood that the specific embodiments are for purposes of illustration and not limitation, as other variations will occur to those of skill in the art. Furthermore, while the invention has been illustrated in connection with its application to containers carried on a vessel, it should be appreciated that the present container security system could be used with containers carried by other shipping conveyances where the containers are shipped over areas not served by normal cellular phone coverage. For example, the invention might be advantageously employed with rail cars where a railroad route passes through unpopulated or remote areas not in range of commercial cellular telephone service. Moreover, the invention could also be used to provide security for a group of shipping containers in land based storage. Finally, it should also be noted that other forms of wireless one-way or two-way communication devices could be employed rather than the cellular telephone described in connection with the illustrated embodiment.

What is claimed is:

1. A security system for a group of shipping containers carried on a vessel, comprising:
    a detection device carried on each container for detecting an intrusion into the container;
    a wireless transmitter carried on each of the containers and coupled with the corresponding detection device, said wireless transmitter for transmitting a signal indicating detection of the intrusion,
    a plurality of base receiver stations located in spaced apart relationship on the vessel for receiving signals from the wireless transmitters carried on the containers;
    wherein each of the base receiver stations receives and transmits signals in two-way communication with a respective container in closest proximity to a respective base receiver station, said two-way communication comprising signals originating with said respective base receiver station, and,
    a communication system onboard the vessel, the communication system being communicatively coupled with each base receiver station and operable for transmitting information relating to the detected intrusion to a location off-board the vessel.

2. The security system of claim 1, wherein each of the transmitters comprises a cellular telephone.

3. The security system of claim 2, wherein each of the cellular telephones has a unique identification number correlated to the container on which it is carried.

4. The security system of claim 1, wherein the base receiver stations are longitudinally spaced along the length of the vessel.

5. The security system of claim 1, wherein the communication system includes a controller for receiving the signals from the base stations and for generating messages for transmission to the off-board location, wherein each of the messages includes identification of the container in which an intrusion has been detected and the geographic location of the vessel.

6. The security system of claim 5, wherein the controller includes a computer responsive to requests from the off-board location to transmit the transmit intrusion detection information for all of the containers to the off-board location.

7. The security system of claim 1, wherein the communication system includes a satellite transmitter for transmitting the information to the off-board location via a communications satellite.

8. The security system of claim 1, further comprising a wireless receiver coupled with the wireless transmitter to provide duplex communication with the base station, and wherein the transmitter and receiver operate on frequencies between about 800 MHz and 1900 MHz.

9. The security system of claim 1, wherein the communication system includes a computer responsive to requests from the off-board location to transmit intrusion detection information for all of the containers to the off-board location.

10. A security system for a group of shipping containers carried on a shipping conveyance, such as a vessel, comprising:
    a plurality of security event detection devices respectively associated with the containers for detecting a security event occurring at the associated container;
    a plurality of cellular telephone units respectively coupled with the detection devices and operable for initiating a telephone call when the associated detection device detects a security event; and,
    a communication system onboard the conveyance for receiving telephone calls initiated by the cellular telephone units, and for sending messages to a security monitoring station off-board the conveyance each of the cellular telephone units is attached to the associated container,
    wherein each of the cellular telephone units is attached to the associated container,
    wherein the communication system includes a plurality of base communication stations positioned at spaced apart locations on the shipping conveyance, each of the base stations being within communication range of certain ones one of the telephone units, and
    wherein the cellular telephone units and the base communication stations are arranged in a plurality of communication cells in which a group of the cellular telephone units are associated with and communicate only with one of the base communication stations, said communication comprising two-way communication, said two-way communication comprising signals originating with said one of the base communication stations.

11. The security system of claim 10 wherein the cellular telephone units are each operable for duplex communication with the communications system and operate on radio frequencies between about 800 MHz and 1900 MHz.

12. The security system of claim 10, wherein at least certain of the detection devices are operable to detect the opening of an access door in the associated container.

13. The security system of claim 10, wherein each of the cellular telephone units includes a unique communication address that identifies the associated container.

14. The security system of claim 10, wherein the communication system includes:
  a wireless radio transmitter for transmitting the messages from the conveyance to the security monitoring station, and
  a controller for controlling the operation of the base stations, and for generating the messages based on detection information obtained from telephone calls initiated by the cellular telephone units.

15. The security system of claim 14, wherein each of the messages includes identification of the container in which the security event is detected and the geographic location of the conveyance.

16. The security system of claim 10, wherein the communication system includes a satellite transmitter for transmitting the messages from the conveyance to a communications satellite for delivery to the security monitoring station.

17. A system for container security based on cellular communications, comprising:
  a shipping conveyance for carrying shipping containers;
  a GPS receiver on said shipping conveyance for providing the geographic position of said shipping conveyance;
  a satellite terminal on said shipping conveyance for transmitting security status information to a security monitoring station;
  a plurality of cellular base stations on said shipping conveyance;
  a cellular device associated with each shipping container on said shipping conveyance for transmitting the security status of the container to a proximal cellular base station wherein the cellular devices and the cellular base stations are arranged in a plurality of communication cells in which a group of the cellular devices are associated with and communicate only with one of the cellular base stations, said communication comprising two-way communication, said two-way communication comprising signals originating with said one of the cellular base stations; and,
  a central computer for receiving the security status information from the base station, for receiving the shipping conveyance position from the GPS receiver, and for directing the satellite transmitter to transmit the security status information and the shipping conveyance position to the security monitoring station.

18. The container security system of claim 17, wherein the computer receives requests for real-time container security status from the satellite terminal and is responsive to the requests to direct the satellite transmitter to transmit the real time security status of the container to the security monitoring station.

19. The container security system of claim 17, wherein the computer is responsive to requests from the security monitoring station to direct the satellite transmitter to transmit the security status of each of a plurality of the containers.

20. The container security system of claim 17, wherein the cellular device has a unique identification number correlated to the container for which it transmits security status.

21. A method of monitoring the security status of shipping containers being transported on a shipping conveyance, comprising the steps of:
  (A) detecting a breach of security in one of the containers, a cellular communication device associated with each container;
  (B) initiating a cellular communication transmission from the container to a base communication station onboard the conveyance, wherein said base communication station comprises one of a plurality of base communication stations arranged in a plurality of communication cells on said shipping conveyance wherein a respective cellular communication device initiating a respective cellular communication transmission is associated with and communicates only with one of said base communication stations, said communication comprising two-way communication said two-way communication comprising signals originating with said one of the base communication stations;
  (C) receiving the cellular transmission at the base communications station;
  (D) generating a security status message onboard the conveyance using the information contained in the transmission received in step (C); and,
  (E) transmitting the message generated in step (D) to a security monitoring station off-board the conveyance.

22. The method of claim 21, whereon step (A) includes detecting an intrusion into the container.

23. The method of claim 21, wherein the message generated in step (D) includes an identification of the container in which the security breach was detected in step (A), and the geographic location of the conveyance.

24. The method of claim 21, wherein step (E) is performed using a satellite communication system.

25. The method of claim 21, further comprising the steps of:
  (F) receiving a container security status request from the security monitoring station; and,
  (G) transmitting to the security monitoring station the security status of all of the containers.

26. The method of claim 21, further comprising the step of:
  (F) periodically transmitting to the security monitoring station the security status of all of the containers.

27. The method of claim 26, wherein step (F) is performed using a satellite terminal onboard the shipping conveyance.

28. A method of monitoring security intrusions into shipping containers on a vessel, comprising the steps of:
  (A) detecting an intrusion into one of the containers, a wireless radio device associated with each container;
  (B) initiating a limited range wireless radio transmission from the container, wherein the wireless transmission contains information related to the intrusion detected in step (A);
  (C) receiving the transmission at a base communication station onboard the vessel within range of the transmission wherein said base communication station comprises one of a plurality of base communication stations arranged in a plurality of communication cells on said vessel wherein a respective wireless radio device initiating a respective wireless radio transmission is associated with and communicates only with one of said base communication stations, said communication comprising two-way communication, said two-way communication comprising signals originating with said one of the base communication stations; and, (D) retransmitting the information from the vessel to a security monitoring station off-board the vessel.

29. The method of claim 28, wherein step (B) is performed using a cellular telephone, and the transmission includes information identifying the cellular telephone initiating the transmission.

30. The method of claim 29, including the step of associating the identity of the cellular telephone with the identity of the container from which the radio, transmission was initiated.

31. The method of claim 28, including the step of placing said plurality of the base communication stations at spaced apart locations on the vessel respectively defining said communication cells.

32. The method of claim 28, wherein step (D) is performed using a satellite communication system.

33. The method of claim 28, further comprising the step of transmitting the geographic location of the vessel to the security monitoring station along with information retransmitted in step (D).

34. The method of claim 28, further comprising the steps of:

(E) receiving a container security status request from the security monitoring station; and,
(F) transmitting to the security monitoring station the security status of all of the containers.

35. The method of claim 28, further comprising the step of:
(E) periodically transmitting to the security monitoring station the security status of all of the containers.

36. The method of claim 35, wherein step (E) is performed using a satellite terminal onboard the vessel.

* * * * *